(12) United States Patent
Shemer et al.

(10) Patent No.: US 10,931,546 B2
(45) Date of Patent: Feb. 23, 2021

(54) DATA REDUCTION TECHNIQUES FOR A MULTI-SENSOR INTERNET OF THINGS ENVIRONMENT

(71) Applicant: EMC IP Holding Company LLC, Hopkinton, MA (US)

(72) Inventors: Jehuda Shemer, Kfar Saba (IL); Kfir Wolfson, Beer Sheva (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/024,757

(22) Filed: Jun. 30, 2018

(65) Prior Publication Data
US 2020/0007420 A1 Jan. 2, 2020

(51) Int. Cl.
*H04L 12/26* (2006.01)
*H04L 12/24* (2006.01)
(Continued)

(52) U.S. Cl.
CPC ........ *H04L 43/024* (2013.01); *H04L 41/0896* (2013.01); *H04L 67/125* (2013.01); *H04Q 9/02* (2013.01)

(58) Field of Classification Search
CPC ..... H04L 43/02; H04L 43/022; H04L 43/024; H04L 67/125; H04L 41/0896; H04Q 9/02
See application file for complete search history.

(56) References Cited

U.S. PATENT DOCUMENTS

| 10,156,992 | B2 * | 12/2018 | Geisler | G06F 3/0641 |
| 2009/0009317 | A1 * | 1/2009 | Weaver | G06Q 10/06 340/517 |

(Continued)

FOREIGN PATENT DOCUMENTS

EP 0771102 10/2003

OTHER PUBLICATIONS

Geddik et al, ASAP: An Adaptive Sampling Approach to Data Collection in Sensor Networks, Published in: IEEE Transactions on Parallel and Distributed Systems ( vol. 18 , Issue: 12 , Dec. 2007) pp. 1766-1783 , Date of Publication: Nov. 5, 2007 (Year: 2007).*

(Continued)

*Primary Examiner* — Gary Mui
(74) *Attorney, Agent, or Firm* — Ryan, Mason & Lewis, LLP

(57) ABSTRACT

Data reduction techniques are provided for a multi-sensor IoT environment. An exemplary method comprises: dynamically determining, by a device within a distributed network comprised of a plurality of sensors, an amount of sensor data to be collected by and/or transmitted by a sensor within the distributed network based on at least one predefined spatial-based rule and/or at least one predefined temporal-based rule; and processing the sensor data based on the dynamically determined amount of sensor data. A percentage of the plurality of sensors within the distributed network that collect and/or transmit the sensor data can optionally be specified. One or more sensors optionally collect the sensor data at a default resolution and a predefined spatial-based rule and/or a predefined temporal-based rule specifies a predefined trigger for at least one sensor to collect and/or transmit the sensor data at a higher resolution.

20 Claims, 7 Drawing Sheets

(51) Int. Cl.
*H04Q 9/02* (2006.01)
*H04L 29/08* (2006.01)

(56) References Cited

U.S. PATENT DOCUMENTS

| | | | |
|---|---|---|---|
| 2010/0124941 A1 | 5/2010 | Cho et al. | |
| 2010/0208637 A1* | 8/2010 | Park | H04L 47/14 370/311 |
| 2010/0241655 A1* | 9/2010 | Lee | H04W 28/06 707/769 |
| 2013/0018575 A1* | 1/2013 | Birken | G01B 11/2513 701/409 |
| 2014/0019397 A1* | 1/2014 | Alexander | H04W 4/029 706/46 |
| 2014/0055627 A1 | 2/2014 | Fuji et al. | |
| 2014/0148699 A1 | 5/2014 | Shim et al. | |
| 2014/0267652 A1 | 9/2014 | Wexler et al. | |
| 2014/0288866 A1* | 9/2014 | Lee | G01D 18/00 702/89 |
| 2015/0003309 A1* | 1/2015 | Mukherjee | H04L 45/24 370/311 |
| 2015/0112980 A1 | 4/2015 | Sanio et al. | |
| 2016/0018879 A1* | 1/2016 | Hsiao | G06F 1/3215 713/324 |
| 2016/0197999 A1* | 7/2016 | Chun | H04L 67/2804 709/217 |
| 2016/0309141 A1 | 10/2016 | Pulli et al. | |
| 2017/0092139 A1* | 3/2017 | Wang | G01W 1/02 |
| 2017/0132853 A1* | 5/2017 | Matos | G07C 5/008 |
| 2017/0289738 A1* | 10/2017 | Jepson | A61B 5/7221 |
| 2018/0188380 A1* | 7/2018 | Venkatraman | G01S 19/34 |
| 2018/0288502 A1* | 10/2018 | Higuchi | G07C 5/008 |
| 2018/0345958 A1* | 12/2018 | Lo | G05D 1/0088 |
| 2018/0365704 A1* | 12/2018 | Atkinson | G06K 19/06028 |
| 2018/0365977 A1* | 12/2018 | Inoue | G08C 17/02 |
| 2018/0371940 A1* | 12/2018 | Pool | H04L 43/08 |

OTHER PUBLICATIONS

Martincic et al., Adaptive data collection in sensor networks, Published in: 2009 2nd IFIP Wireless Days (WD), Date of Conference: Dec. 15-17, 2009, Date Added to IEEE Xplore: Apr. 15, 2010 (Year: 2009).*

Makhoul et al., Data Reduction in Sensor Networks: Performance Evaluation in a Real Environment, Published in: IEEE Embedded Systems Letters ( vol. 9 , Issue: 4 , Dec. 2017 ), pp. 101-104, Date of Publication: Sep. 5, 2017 (Year: 2017).*

Liang et al.; "Redundancy Reduction in Wireless Sensor Networks Using SVD-QR", Published in: MILCOM 2005—2005 IEEE Military Communications Conference Date of Conference: Oct. 17-20, 2005 Date Added to IEEE Xplore: Mar. 20, 2006; DOI: 10.1109/MILCOM.2005.1605943; Print ISBN: 0-7803-9393-7 (Year: 2006).*

Xie et al.; "Anomaly Detection and Redundancy Elimination of Big Sensor Data in Internet of Things"; arXiv:1703.03225v1 [cs.DC] Mar. 9, 2017, https://arxiv.org/abs/1703.03225v1 (Year: 2017).*

U.S. Appl. No. 16/040,775 entitled "Super-Resolution Imaging for a Multi-Sensor Internet of Things Environment", filed Jul. 20, 2018.

U.S. Appl. No. 15/959,592 entitled, "Data Management Policies for Internet of Things Components,", filed Apr. 23, 2018.

* cited by examiner

DATA REDUCTION POLICY 200

☐ SPATIAL-BASED RULE(S) 210
☐ TEMPORAL-BASED RULE(S) 220
☐ SENSOR COLLECTION/TRANSMISSION POLICIES 230
☐ BANDWIDTH POLICIES 240
☐ SAMPLING POLICIES 250

FIG. 2

DATA REDUCTION POLICY 500
{
    DESIRED DATA RESOLUTION 510
        PER GEOGRAPHIC REGION
        PER TIME UNIT
    BANDWIDTH POLICY 520
        LIMIT TOTAL BANDWIDTH
        LIMIT AMOUNT OF DATA EACH SENSOR TRANSMITS
    SAMPLING POLICY 530
        FAVOR UPDATES TO SPECIFIC LOCATIONS OVER OTHERS
}

FIG. 5

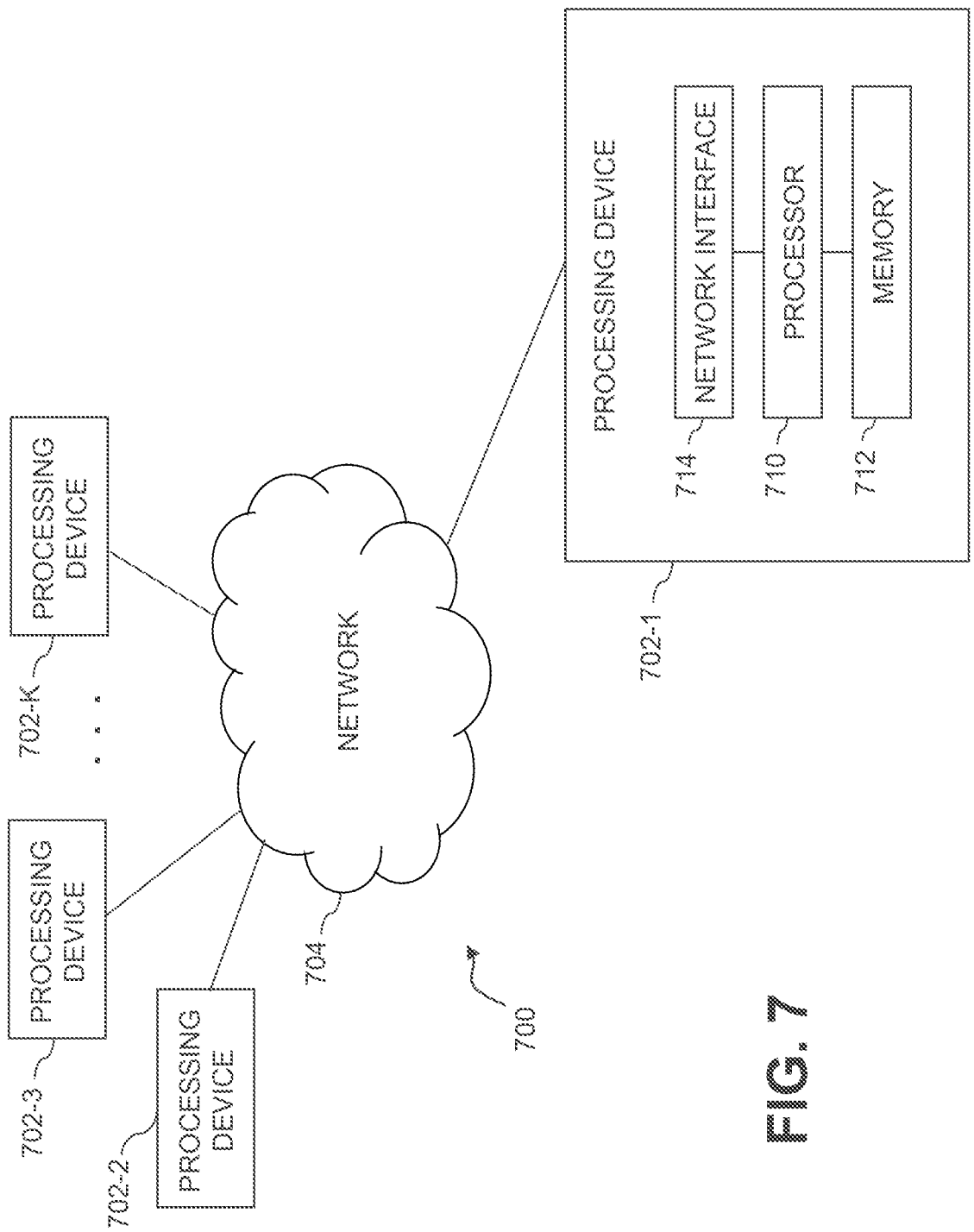

DATA REDUCTION TECHNIQUES FOR A MULTI-SENSOR INTERNET OF THINGS ENVIRONMENT

FIELD

The field relates generally to the processing of sensor data.

BACKGROUND

The Internet of Things (IoT) is a network of distributed physical devices, such as vehicles and sensors, that exchange data over the network. With the proliferation of IoT networks, sensor data comprises information regarding a number of diverse physical variables. Such information is useful for a wide range of applications, such as surveillance and other law enforcement applications, medical monitoring, transportation monitoring, habitat monitoring, factory control, and pipeline integrity.

A number of IoT management frameworks exist for managing devices that generate and process sensor data. As society grows increasingly dependent on such sensor data, the proper management of the gathered sensor data also becomes important. It has been estimated, for example, that the amount of sensor data generated and transferred by vehicle sensors significantly exceeds the amount of available bandwidth, including the bandwidth available using vehicle-to-vehicle and other communication routing mechanisms.

A need exists for data reduction techniques for a multi-sensor IoT environment.

SUMMARY

Illustrative embodiments of the present disclosure provide data reduction techniques for a multi-sensor IoT environment. In one embodiment, an exemplary method comprises: dynamically determining, by at least one processing device within a distributed network comprised of a plurality of sensors, an amount of sensor data to be one or more of collected by and transmitted by at least one of the plurality of sensors within the distributed network based on one or more of at least one predefined spatial-based rule and at least one predefined temporal-based rule; and processing the sensor data based on the dynamically determined amount of sensor data.

In some embodiments, the at least one predefined spatial-based rule and/or the at least one predefined temporal-based rule specify a percentage of the plurality of sensors within the distributed network that collect and/or transmit the sensor data. An exemplary predefined spatial-based rule optionally specifies a sampling resolution of the sensor data which is collected by and/or transmitted by one or more sensors within the distributed network based on a distance of the one or more sensors from a point of interest.

In at least one embodiment, one or more sensors collect the sensor data at a default resolution and a predefined spatial-based rule and/or a predefined temporal-based rule specifies a predefined trigger for at least one sensor to collect and/or transmit the sensor data at a higher resolution.

Other illustrative embodiments include, without limitation, apparatus, systems, methods and computer program products comprising processor-readable storage media.

BRIEF DESCRIPTION OF THE DRAWINGS

FIG. 2 illustrates an exemplary data reduction policy, according to some embodiments;

FIG. 5 illustrates exemplary pseudo code for a data reduction policy for the exemplary IoT system of FIG. 1, according to one embodiment of the disclosure;

FIG. 7 illustrates another exemplary processing platform that may be used to implement at least a portion of one or more embodiments of the disclosure.

DETAILED DESCRIPTION

Figure 1:
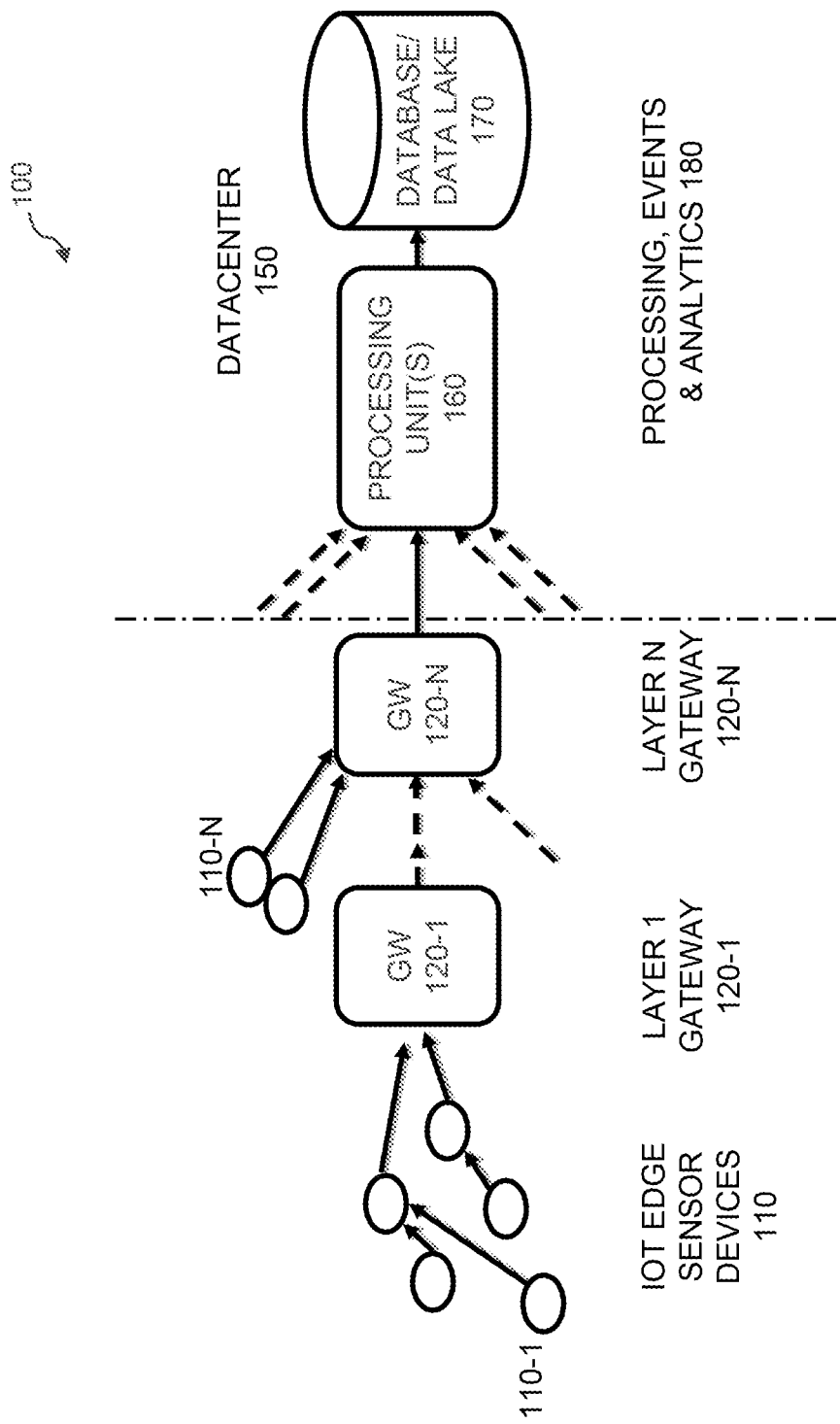
FIG. 1 illustrates an exemplary IoT system, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. Accordingly, the term "sensor" as used herein is intended to be broadly construed, so as to encompass, for example, sensors designed specifically for a specific purpose, such as thermometers, cameras and smoke detectors, as well as general-purpose devices, such as smartphones and tablets that perform a sensing function. One or more embodiments of the disclosure provide methods, apparatus and computer program products for data reduction in a multi-sensor IoT environment.

In one or more embodiments, the disclosed data reduction techniques manage (i) a bandwidth used by a plurality of sensors (e.g., non-stationary sensors) in a distributed network, (ii) a collection and/or transmission of the collected sensor data, and/or (iii) a selection of the sensor data to collect and/or transmit (and at what resolution). One or more embodiments employ cross-sensor distributed algorithms to substantially reduce an amount of data collected and/or transmitted by a given sensor.

In some embodiments, the disclosed data reduction techniques are based on a proximity between sensors, such as vehicle sensors. It has been found that sensors with close geographical proximity and/or temporal proximity tend to create similar or even substantially identical sensor data. By creating localized dynamic distributed sensor networks, time, space and/or priority information between sensors can be coordinated and thereby allow each vehicle, for example, to make intelligent decisions on reducing the amount of data collected and/or transmitted.

In one or more embodiments, holistic data reduction policy techniques are provided for treating sensor data in an IoT system. The disclosed data reduction policies connect IoT components, their sensor data and corresponding metadata in a way that allows advanced data reduction operations to be employed across a distributed network of sensor devices within an IoT system.

One or more aspects of the present disclosure recognize that complex IoT systems have complex data reduction needs, and the failure to address these needs may result in degraded systems or a loss of service. A naïve view that these systems have an infinite amount of back-end storage and infinite bandwidth to transmit the data, is now encountering barriers of capacity and cost. When systems scale, the amount of data to be collected by sensors and transmitted to gateways is often too much, especially when some of the sensor data may be redundant with sensor data collected by other sensors in temporal and/or geographic proximity. Apart from the bandwidth and cost-related aspects, there are implications on the back-end processing scale and cost as well.

In one or more embodiments, a distributed vehicle network comprises a network between vehicles that are within a predefined proximity. For example, a given vehicle in a distributed vehicle network has a set of other vehicles that the given vehicle can connect with (e.g., each vehicle potentially sees a different network (the sub-set of vehicles in its area)). The distributed vehicle network is dynamic in the sense that the set of vehicles can change over time.

In some embodiments, a hotspot (or a point of interest) is a geographical location that for a time period is interesting. A point of interest can be a fixed hotspot, such as a pothole, obstacle or a vehicle accident at a specific location, or a transient hotspot, such as an animal running through a junction.

In one or more embodiments, directional sensors comprise sensors that have a direction of sampling, such as cameras or proximity sensors. With a camera, the direction of the picture typically matters. With vehicles, it is assumed (but not required) that the direction of sampling is along the direction that a given vehicle is travelling.

In at least one embodiment, a multi-resolution format or protocol, such as JPEG (Joint Photographic Experts Group) wavelet technology, is employed to reduce resolution of the sample in an incremental manner. For example, part of the information can be sent up to a specific resolution and sending more information will incrementally increase the resolution.

FIG. 1 illustrates an exemplary IoT system 100, according to one embodiment of the disclosure. Generally, IoT systems, such as the exemplary IoT system 100, typically consolidate edge devices to gateways and then to a central back-end datacenter where most of the processing is done. There can be several layers of gateways. New edge devices are introduced and others retire constantly and the exemplary IoT system 100 needs to handle these topology changes.

As shown in FIG. 1, a plurality of IoT edge sensor devices 110-1 through 110-N (generally referred to herein as sensors 110) provide corresponding sensor readings to one or more layer 1 through layer N gateways 120-1 through 120-N. The IoT edge sensor devices 110-1 through 110-N comprise, for example, sensors, actuators and other devices that produce information or get commands to control the environment they are in. The gateways 120 comprise devices that consolidate communication and management of multiple IoT edge sensor devices 110. For example, a vehicle can be treated as a first gateway layer 110-1 to the multiple sensors that exist within the vehicle. In some embodiments, vehicles are connected to a regional edge layer (not explicitly shown in FIG. 1), where the region can be, for example, a cell of a cellular network. The regional gateways can be connected in some embodiments to Country cloud/gateway that are connected to a global cloud.

One or more sensor devices 110 in vehicles, for example, can generate and distribute high resolution images and maps. High resolution maps are obtained in some embodiments by taking, for example, a 10 Megapixel image every two meters (this is an emerging industry standard). With 100 million vehicles on the road, for example, this will produce many EB (exabyte) of data a month.

One or more aspects of the present disclosure recognize that the amount of data generated by a distributed network of vehicles, for example, is often more than can be transmitted to a centralized cloud, and thus localized networks can be used. Unfortunately, in crowded areas, even the localized network will not be able to accept all of the data from all of the vehicles in the area.

With the current industry approach, there is not enough bandwidth for vehicles to transmit all of the produced sensor data to the cloud. Thus, the sensor data creates network congestion, potentially causing important sensor data to not be sent, to not be delivered or to arrive outside of a defined service level agreement.

As defined above, each vehicle in the exemplary embodiment has its own view of the vehicle population in the area. Therefore, each vehicle essentially has its own vehicle network. As noted above, the vehicle network may not be symmetric as, in some situations, vehicle A may include vehicle B in its network, but vehicle B may not have vehicle A in its network. Due to the speed of the vehicles, vehicles may go in and out of a network within seconds. Here are some ways to establish vehicles in a network in various embodiments:

1. Direct transmission radius—a vehicle typically transmits a radio signal with specific power constraints. Any vehicle that receives that signal and is able to respond is part of the network. Note that although the power is typically fixed, the radius of the network will often be different between vehicles due to physical obstructions and factors that affect signal-to-noise ratios.

2. Radius—using vehicle-to-vehicle networking (or with the help of stationary posts like cellular networks), the limits of radio transmission can be overcome by relaying. Vehicles can respond if they are within a specific radius.

3. Trajectory/location—in some embodiments, vehicles send not just geo-location information but also trajectory and speed. Vehicles that respond need to be in near proximity but also with similar trajectory (or opposite trajectory). This allows for a formation of networks along routes.

While gateways 120 are employed in the exemplary embodiment of FIG. 1, the gateways 120 are not mandatory. Gateways 120 are prevalent in numerous implementations, as networking capabilities of edge devices 110 are usually local in nature (e.g., power or connectivity) and the gateway 120 is used to connect to the Internet (not shown in FIG. 1).

The sensors 110 can be, for example, sensors designed for a specific purpose, such as thermometers, cameras and smoke detectors, as well as general-purpose sensor devices, such as, for example, smartphones and tablets that perform a sensing function, as would be apparent to a person of ordinary skill in the art. In one or more embodiments, the sensors 110 comprise the following public properties: substantially unique identifier (ID), geo-location, and clock timestamp (ongoing).

The exemplary IoT system 100 of FIG. 1 further comprises a datacenter 150 comprising one or more processing unit(s) 160 and a database or data lake 170. The datacenter 150 performs one or more of processing, events and analytics functions 180, in a known manner.

While one or more exemplary embodiments are described herein using sensor devices 110 associated with vehicles, any non-stationary or independently moving sensors can be employed, such as sensor devices 110 associated with planes, boats, drones, trucks and hovercraft, as would be apparent to a person of ordinary skill in the art. Further, while one or more exemplary embodiments are described herein using high resolution maps for connected vehicles, the disclosed techniques work for any multi-sensor environments where sensors generate large amounts of data.

FIG. 2 illustrates an exemplary data reduction policy 200, according to some embodiments. Generally, the exemplary data reduction policy 200 defines how various IoT sensor devices 110 of the exemplary IoT system 100 of FIG. 1 should collect, transmit and/or process the sensor data. Currently, each sensor 110 decides when and what data to transmit, without regard to what data is available and what other sensors 110 can send. For example, in the application of high resolution map systems, one standard requires a high resolution image of the road every two meters. In crowded areas, there will be many vehicles transmitting similar images (comprising large amounts of information) multiple times. Since the bandwidth in a cellular network is limited per area, too many sensors 110 trying to send the data at once will cause congestion. There is currently no mechanism to limit the total amount of data that all of the vehicles collectively send.

As shown in FIG. 2, the exemplary data reduction policy 200 comprises one or more spatial-based rule(s) 210; one or more temporal-based rule(s) 220; one or more sensor collection/transmission policies 230; one or more bandwidth policies 240; and one or more sampling policies 250.

In some embodiments, the spatial-based rule(s) 210 can be employed to implement spatial optimizations to collect data from multiple sensors in a geographical area and to exploit the inherent redundancy of these samples (e.g., to either reduce the amount of samples collected or their resolution, or improve the resulting information by exploiting the redundancy). Spatial optimizations can be employed for non-directional sensors, as well as directional sensors in some cases.

For example, one or more spatial-based rule(s) 210 can specify a sampling policy, a resolution policy, a selective increment policy and/or a sensor density based on location and/or proximity. An exemplary sampling policy can specify that only X vehicles that meet some criteria in a given network or area should send a sensor data sample. For example, a function min (#cars/10, 100) indicates that only 10% of the vehicles in the area will send the information, and no more than 100 (for example, the first 100 vehicles with an identifier that ends in "0"). This sampling policy significantly reduces the amount of data sent and also limits the amount of bandwidth used so that congestion is throttled.

In addition, a resolution policy can be based on a resolution by distance from a particular hotspot, or an inverse resolution by distance. For an implementation based on a resolution by distance from a particular hotspot, vehicles can calculate the distance from the hotspot and will reduce their sample resolution the further they are from the hotspot. This reduction can be a linear reduction or a higher order function. Generally, the further a vehicle is away from the hotspot, the less relevant the information that the vehicle will send.

For an implementation based on an inverse resolution by distance from a particular hotspot, reverses the previous resolution policy and is used to control congestion points. In particular, areas where there are a lot of vehicles can reduce the resolution, as redundancy in the samples can be used to compensate for the overlap. The further you are from the point where there are many vehicles, the collected samples are more dispersed and, therefore, more resolution is needed to compensate.

With an exemplary selective increment policy, a predefined number or percentage of vehicles transmit the images or other sensor data with a predefined low resolution. In addition, a predefined number or percentage of additional vehicles transmit the images or other sensor data with a predefined higher resolution. These additional vehicles (or a central location) compare the low resolution images to the higher resolution images from the geographic area, determine if there is a suspected change, and, if so, request a full resolution image.

Multi-resolution properties, discussed above, are advantageous for use in some embodiments with a selective increment policy. For example, with wavelet-based JPEG technology, a low resolution image can be sent by sending a truncated prefix of the file (E.g., no additional downsampling is needed). If the need for a higher resolution is detected, another incremental section of the file can be sent, so data transmission is efficient. The desired truncation point of each level can be governed by resolution or bandwidth constraints of one of the above optimizations or a policy, discussed below.

With an exemplary sensor density policy, a metric of the sensor density in a specific area can be applied. For example, the sensor density policy can specify a number of sensors of a specific type per square meter, and control transmission resolution according to the local sensor density. The local density is something the vehicles can be aware of, in some embodiments, without going all the way to the central location by using the local network information. This is a global version of earlier options that does not refer to a specific location or hotspot but does a global average over time and/or space.

In some embodiments, the temporal-based rule(s) 220 can be employed to implement temporal policies to substantially optimize samples based on time or a time difference between samples. Vehicles passing through the same area at a similar time will most probably generate the same image and there may not be a need for this amount of redundancy. Directional sensors with movement can benefit from these kinds of temporal optimizations.

For example, one or more temporal-based rule(s) 220 can specify policies for a hotspot over time, where vehicles driving through the same point in the same trajectory take the same or very similar images. Therefore, vehicles can optionally use the network to declare that they took an image at X=(point, trajectory, time). One or more central locations, such as one or more gateways and/or a central back-end datacenter, will maintain a counter, and each vehicle can make a local decision regarding image collection based on messages from the higher layer. Now, only every N vehicles (N=10, for example) will take another image. An average vehicle velocity can optionally be taken into consideration as the faster the traffic the more vehicles can pass before another sample is taken.

In one variation, the specified policies for a hotspot over time can also specify a maximum time. For example, the policy can specify that every N vehicles will take another image or a maximum of 10 minutes. Thus, if there is low traffic, images will still arrive at sufficient intervals.

In addition, one or more temporal-based rule(s) 220 can specify that substantially all vehicles in a network will sample at substantially the exact same time (e.g., every minute start). Since vehicles are distributed over an area, a sample set is obtained of many locations at the same time, and there is no need to take samples in between the specified time samples as other vehicles have covered the area. In various embodiments, the time interval may be set by a central location, a policy or by a distributed decision algorithm that selects an integer.

In further variations, one or more temporal-based rule(s) 220 can specify a variable resolution, or a variable resolution over time. With a variable resolution, every N vehicles takes a high resolution image while the remaining vehicles obtain a low resolution image. With a variable resolution over time, once every predefined interval (e.g., every X minutes), a high resolution image is taken by a predefined number of vehicles closest to a given location (e.g., one vehicle), while the remaining vehicles obtain a low resolution image.

As shown in FIG. 2, the exemplary data reduction policy 200 further comprises one or more sensor collection/transmission policies 230; one or more bandwidth policies 240; and/or one or more sampling policies 250, discussed below. The sensor collection/transmission policies 230, bandwidth policies 240 and/or sampling policies 250 can be combined with the spatial-based rules 210 and/or temporal based rules 220 to achieve a desired data reduction policy 200.

In one or more embodiments, one or more parameters of the data reduction policy 200 can have an explicit or relative target (e.g., down sample the sensor data to half of the original resolution, or filter data to 3 KB per second).

The data reduction policy 200 optionally also specifies a predefined handling of the sensor data when communications are disrupted. For example, when communications are disrupted, the data reduction policy may specify storing samples by one or more sensors until communications resume; discarding samples if there is no communication; sending data to other destinations/locations; and/or archiving the sensor data until communications resume.

The interactions in the exemplary IoT system 100 show how a change in one parameter of the data reduction policy 200 may affect other parts of the IoT system 100. For example, increasing the sampling rate (resolution) results in more storage and more CPUs required to process the data.

Figure 3:
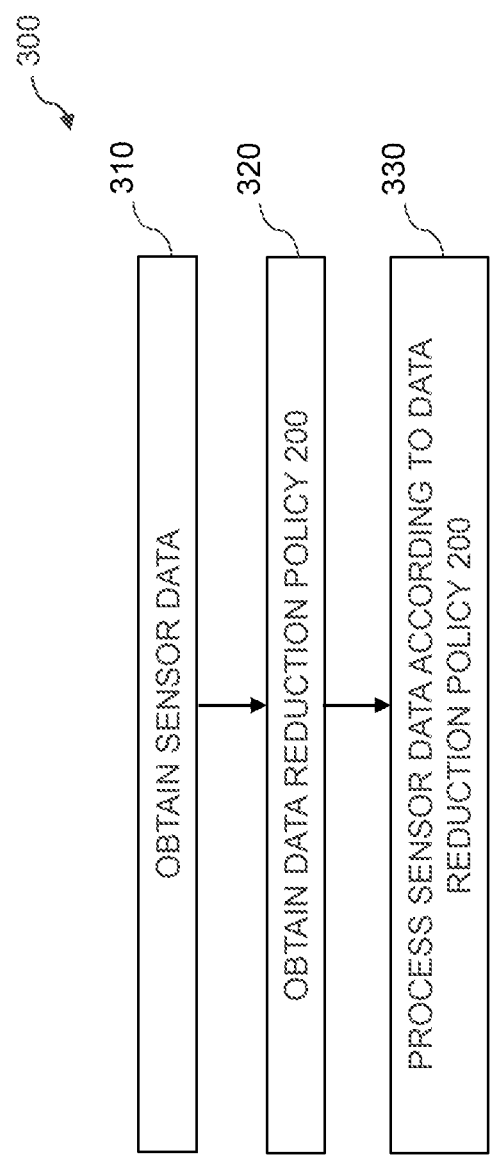
FIG. 3 is a flow chart illustrating a data reduction policy implementation process, according to an embodiment of the disclosure.

FIG. 3 is a flow chart illustrating a data reduction policy implementation process 300, according to an embodiment of the disclosure. The exemplary data reduction policy implementation process 300 is implemented by a given IoT component in the IoT system 100 of FIG. 1 (e.g., the techniques can be applied at any level, such as multiple sensors within an area, or by gateways, concentrators, hubs or other aggregation devices of the same type, or a different type). As shown in FIG. 3, during step 310, the exemplary data reduction policy implementation process 300 initially obtains sensor data. During step 320, the IoT component obtains the data reduction policy 200 (FIG. 2) for processing of the sensor data by one or more IoT components. Finally, during step 330, the exemplary data reduction policy implementation process 300 processes the sensor data based on the data reduction policy 200.

Figure 4:
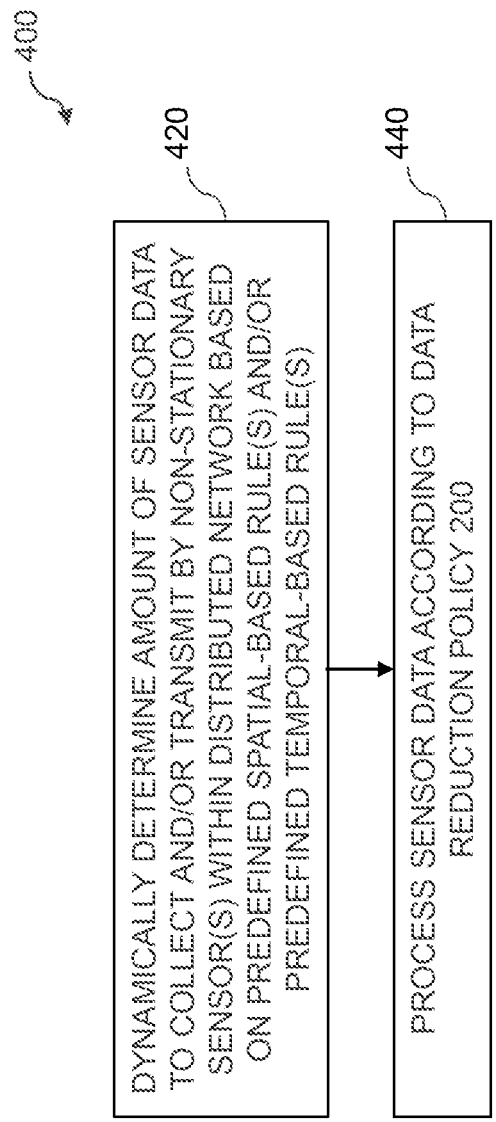
FIG. 4 is a flow chart illustrating an exemplary implementation of a data reduction process, according to some embodiments of the disclosure.

FIG. 4 is a flow chart illustrating an exemplary implementation of a data reduction process 400, according to some embodiments of the disclosure. As shown in FIG. 4, the exemplary data reduction process 400 dynamically determines, during step 420, an amount of sensor data to be collected by and/or transmitted by at least one of a plurality of sensors within a distributed network, based on one or more predefined spatial-based rule(s) 210 or one or more predefined temporal-based rule(s) 220.

Thereafter, the sensor data is processed during step 440 based on the dynamically determined amount of sensor data.

FIG. 5 illustrates exemplary pseudo code for a data reduction policy 500 for the exemplary IoT system 100 of FIG. 1, according to one embodiment of the disclosure. In one or more embodiments, the exemplary data reduction policy 500 is built system wide, across IoT system 100 of FIG. 1 (or portions thereof). In the example of FIG. 5, a policy can be used to govern parameters that control the above stated spatial and/or temporal optimizations and other aspects. For example, the default sampling interval of images at a point or area can be specified in the exemplary data reduction policy 500.

For a more detailed discussion of suitable techniques for using a policy and propagating the policy throughout the IoT system 100, see, for example, U.S. patent application Ser. No. 15/959,592, filed Apr. 23, 2018, entitled "Data Management Policies for Internet of Things Components," incorporated by reference herein in its entirety.

The policy can be defined according to geography (regionally, for example), over time (e.g., take more samples at night) or dynamically (e.g., according to hotspots or other points of interest). Vehicles are optionally updated with the data reduction policies 500, as those may change over time/location and the vehicles can adapt accordingly.

In addition to the optimization parameters described above, other data constraints may be given in an exemplary data reduction policy 500. A multi-sensor data reduction policy 500 may include the following parameters, as shown in FIG. 5:

Desired resolution of data 510. For example, for a given geographic region (e.g., a 20 MP image is needed of the road every two meters); and/or for a given unit of time (e.g., a picture is needed every two hours);

Bandwidth policy 520. For example, the total amount of bandwidth can be limited (e.g., up to 30 Mb/sec in each cellular cell); and/or the amount of data each sensor transmits can be limited (e.g., total transmission of a sensor can be limited or maximal burst bandwidth sensor uses can be limited); and Sampling policy 530 (e.g., are updates to specific locations favored over other locations).

In some embodiments, the data reduction framework can support multiple environments. For example, the management framework can accept general limitations (e.g., bandwidth limits (per device/per area) or required samples (sample resolution, sample time difference)). In one or more embodiments, the data reduction algorithms will have generic APIs for sample resolution and, for example, how many samples are needed for super resolutions. The data reduction framework optionally automatically calls the algorithms based on the available bandwidth and the required policy. In this manner, localized algorithms are created and managed by a global policy.

One or more embodiments of the disclosure address the problems of multiple uncoordinated IoT sensor devices sending very large amounts of information to a back-end service. The disclosed data reduction techniques reduce the traffic by avoiding the transmission of redundant data in some embodiments. Various algorithms are provided to determine the data to send and to increase control and simplify usage to the IoT system administrators in the form of policies.

One or more embodiments of the disclosure provide improved methods, apparatus and computer program products for implementing data reduction policies and techniques for various components of an IoT system. The foregoing applications and associated embodiments should be considered as illustrative only, and numerous other embodiments can be configured using the techniques disclosed herein, in a wide variety of different applications.

It should also be understood that the disclosed techniques for implementing data reduction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for implementing data reduction policies for various components of an IoT system may be implemented using one or more processing platforms. One or more of the processing modules or other components may therefore each run on a computer, a storage device or other processing platform elements. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality, as illustrated and described herein, are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a data reduction policy engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a data reduction policy platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
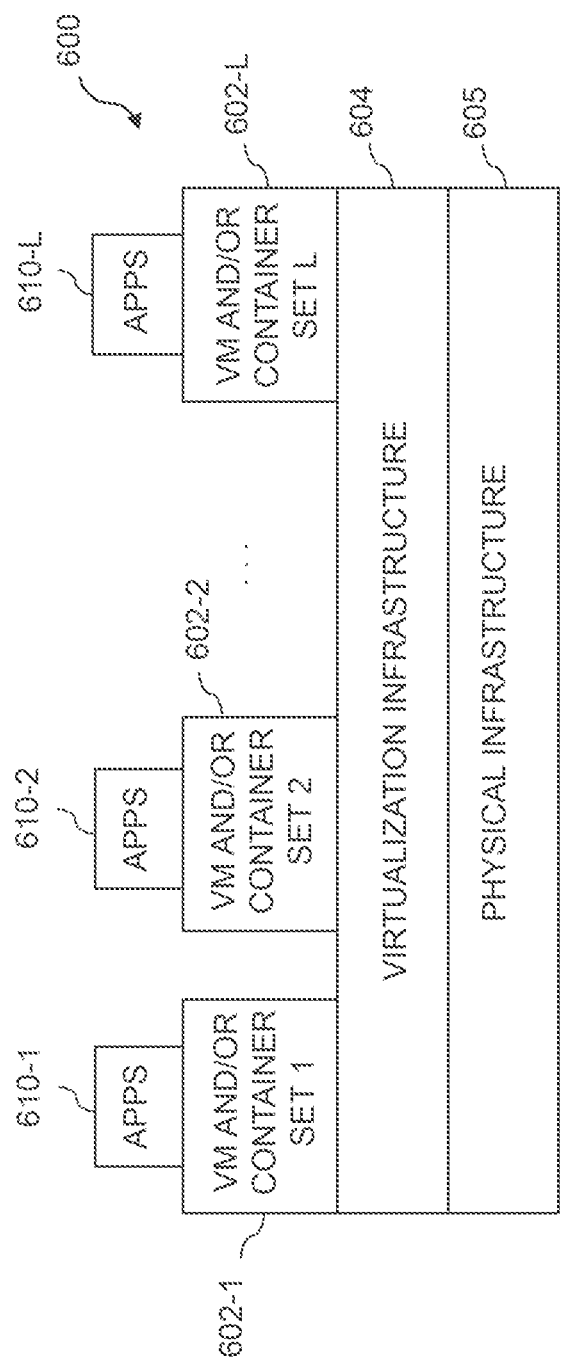
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the disclosed data reduction system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide data reduction functionality of the type described above for one or more processes running on a given one of the VMs. For example, each of the VMs can implement data reduction control logic and associated data reduction functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide data reduction functionality of the type described above for one or more processes running on different ones of the containers. For example, a container host device supporting multiple containers of one or more container sets can implement one or more instances of data reduction control logic and functions.

As is apparent from the above, one or more of the processing modules or other components of disclosed data reduction system may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, ... 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
dynamically determining, by at least one processing device within a distributed network comprised of a plurality of sensors, an amount of sensor data to be transmitted by at least one of the plurality of sensors within the distributed network based at least in part on one or more of: (i) at least one predefined spatial-based rule that specifies the amount of sensor data to be transmitted by the at least one sensor based at least in part on one or more of: (a) a location of one or more of the sensors with respect to a geographic location of a point of interest being evaluated in the sensor data and (b) a proximity of two or more of the sensors with respect to one another, and (ii) at least one predefined temporal-based rule that specifies the amount of sensor data to be transmitted by the at least one sensor based at least in part on a time difference between a plurality of samples of the sensor data, wherein the one or more of the at least one predefined spatial-based rule and the at least one predefined temporal-based rule evaluate at least one data element received from one or more of the plurality of sensors; and
processing, by the at least one processing device, the sensor data based on the dynamically determined amount of sensor data.

2. The method of claim 1, wherein the sensors within the distributed network are identified based on one or more of a direct transmission radius between the sensors, a radius between the sensors, and one or more of a trajectory and location of the sensors.

3. The method of claim 1, wherein one or more of the at least one predefined spatial-based rule and the at least one predefined temporal-based rule specify a percentage of the plurality of sensors within the distributed network that one or more of collect and transmit the sensor data.

4. The method of claim 1, wherein the at least one predefined spatial-based rule specifies a sampling resolution of the sensor data one or more of collected by and transmitted by one or more of the plurality of sensors within the distributed network based on a distance of the one or more sensors from a point of interest.

5. The method of claim 1, wherein one or more of the plurality of sensors collect the sensor data at a default resolution and wherein one or more of the at least one predefined spatial-based rule and the at least one predefined temporal-based rule specifies a predefined trigger for at least one sensor to one or more of collect and transmit the sensor data at a higher resolution.

6. The method of claim 1, wherein the at least one predefined spatial-based rule specifies a resolution for the one or more sensors to one or more of collect and transmit the sensor data based on a predefined local sensor density.

7. The method of claim 1, wherein the at least one predefined temporal-based rule specifies a particular time for the plurality of sensors within the distributed network to collect the sensor data.

8. The method of claim 1, wherein one or more of the at least one predefined spatial-based rule and the at least one predefined temporal-based rule are based on one or more predefined policies.

9. A system, comprising:
   a memory; and
   at least one processing device, coupled to the memory, operative to implement the following steps:
   dynamically determining, by the at least one processing device within a distributed network comprised of a plurality of sensors, an amount of sensor data to be transmitted by at least one of the plurality of sensors within the distributed network based at least in part on one or more of: (i) at least one predefined spatial-based rule that specifies the amount of sensor data to be transmitted by the at least one sensor based at least in part on one or more of: (a) a location of one or more of the sensors with respect to a geographic location of a point of interest being evaluated in the sensor data and (b) a proximity of two or more of the sensors with respect to one another, and (ii) at least one predefined temporal-based rule that specifies the amount of sensor data to be transmitted by the at least one sensor based at least in part on a time difference between a plurality of samples of the sensor data, wherein the one or more of the at least one predefined spatial-based rule and the at least one predefined temporal-based rule evaluate at least one data element received from one or more of the plurality of sensors; and
   processing, by the at least one processing device, the sensor data based on the dynamically determined amount of sensor data.

10. The system of claim 9, wherein one or more of the at least one predefined spatial-based rule and the at least one predefined temporal-based rule specify a percentage of the plurality of sensors within the distributed network that one or more of collect and transmit the sensor data.

11. The system of claim 9, wherein the at least one predefined spatial-based rule specifies a sampling resolution of the sensor data one or more of collected by and transmitted by one or more of the plurality of sensors within the distributed network based on a distance of the one or more sensors from a point of interest.

12. The system of claim 9, wherein one or more of the plurality of sensors collect the sensor data at a default resolution and wherein one or more of the at least one predefined spatial-based rule and the at least one predefined temporal-based rule specifies a predefined trigger for at least one sensor to one or more of collect and transmit the sensor data at a higher resolution.

13. The system of claim 9, wherein the at least one predefined spatial-based rule specifies a resolution for the one or more sensors to one or more of collect and transmit the sensor data based on a predefined local sensor density.

14. The system of claim 9, wherein one or more of the at least one predefined spatial-based rule and the at least one predefined temporal-based rule are based on one or more predefined policies.

15. A computer program product, comprising a non-transitory machine-readable storage medium having encoded therein executable code of one or more software programs, wherein the one or more software programs when executed by at least one processing device perform the following steps:
   dynamically determining, by the at least one processing device within a distributed network comprised of a plurality of sensors, an amount of sensor data to be transmitted by at least one of the plurality of sensors within the distributed network based at least in part on one or more of: (i) at least one predefined spatial-based rule that specifies the amount of sensor data to be transmitted by the at least one sensor based at least in part on one or more of: (a) a location of one or more of the sensors with respect to a geographic location of a point of interest being evaluated in the sensor data and (b) a proximity of two or more of the sensors with respect to one another, and (ii) at least one predefined temporal-based rule that specifies the amount of sensor data to be transmitted by the at least one sensor based at least in part on a time difference between a plurality of samples of the sensor data, wherein the one or more of the at least one predefined spatial-based rule and the at least one predefined temporal-based rule evaluate at least one data element received from one or more of the plurality of sensors; and
   processing, by the at least one processing device, the sensor data based on the dynamically determined amount of sensor data.

16. The computer program product of claim 15, wherein one or more of the at least one predefined spatial-based rule and the at least one predefined temporal-based rule specify a percentage of the plurality of sensors within the distributed network that one or more of collect and transmit the sensor data.

17. The computer program product of claim 15, wherein the at least one predefined spatial-based rule specifies a sampling resolution of the sensor data one or more of collected by and transmitted by one or more sensors within the distributed network based on a distance of the one or more of the plurality of sensors from a point of interest.

18. The computer program product of claim 15, wherein one or more of the plurality of sensors collect the sensor data at a default resolution and wherein one or more of the at least one predefined spatial-based rule and the at least one predefined temporal-based rule specifies a predefined trigger for at least one sensor to one or more of collect and transmit the sensor data at a higher resolution.

19. The computer program product of claim 15, wherein the at least one predefined spatial-based rule specifies a resolution for the one or more sensors to one or more of collect and transmit the sensor data based on a predefined local sensor density.

20. The computer program product of claim 15, wherein one or more of the at least one predefined spatial-based rule and the at least one predefined temporal-based rule are based on one or more predefined policies.

* * * * *